Feb. 26, 1963 R. A. CLARK 3,078,836
BURNER BOWL AND BURNER GRATE MOUNTING FOR COOKING STOVE
Filed Aug. 24, 1961

INVENTOR.
ROBERT A. CLARK
BY
ATT'Y.

United States Patent Office 3,078,836
Patented Feb. 26, 1963

3,078,836
BURNER BOWL AND BURNER GRATE
MOUNTING FOR COOKING STOVE
Robert A. Clark, Allentown, Pa., assignor to Caloric
Appliance Corporation, Topton, Pa., a corporation of
Pennsylvania
Filed Aug. 24, 1961, Ser. No. 133,606
3 Claims. (Cl. 126—39)

Conventional cooking stoves have a main cooking top, a number of surface burners, and cooking utensil supports which overlie the burners. The burners are arranged in one or more groups or clusters and aerating pans are fitted into the main top so as to underlie each group of burners. For example, if the stove has four adjacent burners, it will have a four-opening aerating pan. If it has four burners in one group and two burners in another, it will have one four-opening aerating pan and a two-opening aerating pan, and so on. Large aerating pans are hard to clean in the limited space of a kitchen sink and are expensive to replace in case of damage.

One object of this invention is to provide an arrangement whereby each burner is provided with its own aerating pan, which is hereinafter referred to as the burner bowl, and to provide an improved mounting for said individual burner bowls.

A still further object is to produce an improved construction in which the burner bowls are easily installed and removed and in which each bowl is automatically centered in relation to its burner and burner opening.

Each surface burner is provided with an individual utensil support which is hereinafter referred to as the grate, and the grates have heretofore been mounted by means of spaced bottom lugs, or pins, which are insertable in holes in the aerating pans of the burners. This arrangement is not quite satisfactory because it was necessary to "hunt" before the pins could be inserted into the holes and the grate resting on the surface of the aerating pans which are flush with the main top of the stove presented a crude appearance.

It is therefore another object of the invention to produce an improved mounting for the burner grates whereby the grate can be positioned without hunting and whereby only a relatively small portion of the grate projects above the main top and thus presents an attractive appearance.

The full nature of the invention will be understood from the following specification and the accompanying drawings in which.

Figure 1:
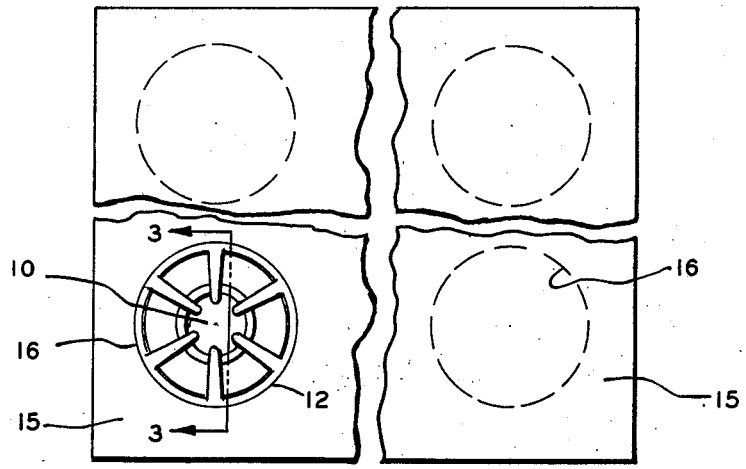
FIG. 1 is a top plan view of a cooking stove embodying the invention, only the left front burner being shown in full.

The stove illustrated may have any desired number of burners arranged in any desired pattern, each burner being supplied with gas by means of a conventional valve connected to a conventional manifold. Since these elements are in no way involved in carrying out the invention, they are not shown, nor described. It is sufficient to point out that a conventional burner 10 is provided with a grate formed of a body in ring 12 and overlaying arms 14 which support a cooking utensil over the burner. As stated, the conventional grate was provided with spaced, bottom lugs, not shown, which engaged holes, not shown, in the main top or in the aerating pans which form part of the main top 15.

According to the present invention, main top 15 is provided with a number of burner openings 16, each of which is defined by a continuous pendent flange 18, the lower edge of which carries spaced, horizontal inwardly, radially extending ledges 20, 21 and 22 the inner edges of which define a second circular opening. Also, according to the invention, each burner has an individual, round underlying aerating pan or bowl which is formed of a bottom wall 24, an inner vertical continuous side wall 26 and an outer continuous side wall 28 which depends from the upper edge of side wall 26 and serves as a mounting rim for the bowl in the manner hereinafter set forth. The bottom 24 of the bowl is provided with a central opening 30 for accommodating burner 10. It will be noted that the outer wall 28 of the bowl is shorter than its inner wall 26. By this arrangement, lowering the bowl into an opening 16, causes the lower edge of outer wall 28 to rest on ledges 20, 21 and 22 (see FIG. 2), and causes the outer side of inner wall 26 to abut the inner edges 23 of ledges 20, 21 and 22 automatically to center the burner bowl. It will also be noted that the outside diameter of the bowl is smaller than the inside diameter of the opening defined by pendent flange 18 to provide an annular space between wall 28 and flange 18 for receiving the annular body 12 of the grate.

The grate of this invention is provided with spaced, pendent tongues 31, 32 and 33 whereby when portions 38, 39 and 40 of the bottom surface of the grate ring 12, come to rest on horizontal ledges 20, 21 and 22, tongues 31, 32 and 33 will depend into spaces 34, 35 and 36 between said ledges. Spaces 34, 35 and 36 are sufficiently large, easily to receive pendent tongues 31, 32 and 33, but are small enough to prevent appreciable rotation of the grate about the axis of the burner opening. In other words, spaces 34, 35 and 36 should be such that, if the grate is haphazardly lowered into burner opening 16 and rotated slightly, in either direction, tongues 31, 32 and 33 will fall into the spaces between ledges 20, 21 and 22 and further rotation of the grate will be prevented by the abutment of the vertical edges 42 of the tongues with the vertical edges 44 of horizontal ledges 20, 21 and 22. In this connection, it is pointed out that the drawings are not to scale.

In actual use, the burner bowl is lowered into burner opening 16 until its outer wall 28 comes to rest on ledges 20, 21 and 22, in which position its inner wall 26 abuts edges 23 of ledges 20, 21 and 22. Grate ring 12 is then inserted between outer wall 28 of the bowl and flange 18 of the main top and is rotated, in either direction, until tongues, 31, 32 and 33 fall into spaces 34, 35 and 36. It will be noted that no hunting is needed and that the grate and the individual burner bowl are easily installed or removed.

Figure 2:
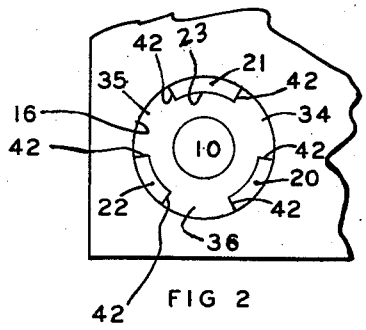
FIG. 2 is a top plan view of the left front burner, with the grate removed.
Figure 3:
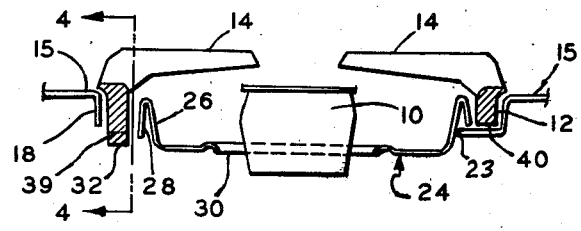
FIG. 3 is a sectional view looking in the direction of line 3—3 on FIG. 1.
Figure 4:
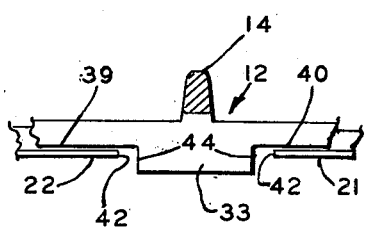
FIG. 4 is a sectional view looking in the direction of line 4—4 on FIG. 3.
Figure 5:
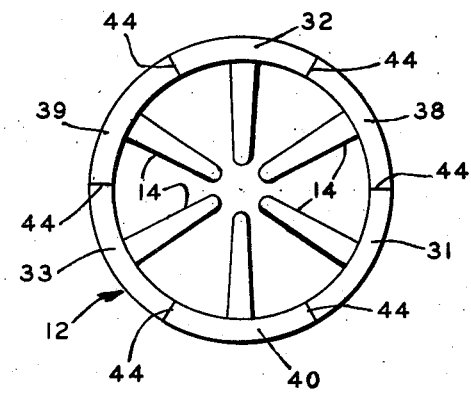
FIG. 5 is a bottom plan view of the grate embodying this invention.

It will be seen from FIG. 2 that the major portion of the burner ring is below the main top 15 and that only the upper edge of the grate ring and its fingers 14 are above the main top. In practice, this has been found to produce a most attractive appearance, as compared with conventional structures in which the grate ring rests on main top 15 and the entire height of the grate is visible above the main top.

What I claim is:

1. In a cooking stove, a horizontal top plate having a circular opening therein, said opening being defined by a circular, vertical peripheral wall depending from said top plate, a plurality of horizontal ledges extending radially inward from the lower edge of said peripheral wall to form, in conjunction with said peripheral wall and top plate, a stepped configuration, said ledges being circumferentially spaced from each other, a burner bowl positioned within said opening, said burner bowl being defined by an upstanding peripheral wall, said peripheral wall of the burner bowl extending upwardly to a height above that of said ledges and having a depending rim extending down into abutment with the upper surfaces of said ledges, said rim being spaced radially inward from the peripheral wall of said top plate to form an annular channel therebetween with the ledges forming floor areas for said channel, a grate positioned within said opening, said grate comprising a circular ring having radially inwardly extending arms, said arms being circumferentially spaced from each other, said ring being rotatively retained within said annular channel while resting on said ledges, and a plurality of circumferentially-spaced tongues depending from said ring, each tongue extending through a corresponding space between the ledges, and said tongues being substantially of lesser extent in the circumferential plane of the opening than the spaces between said ledges to permit substantial relative movement of said tongues within said spaces corresponding to circular movement of said grate ring within said channel.

2. The structure of claim 1 wherein the upper edge of the peripheral wall of the burner bowl is at substantially the same height as the top plate.

3. The structure of claim 1 wherein the radially inner edge of each ledge is in abutment with a median portion of the peripheral wall of the burner bowl.

References Cited in the file of this patent

UNITED STATES PATENTS

| | | |
|---|---|---|
| 1,764,719 | Gercich | June 17, 1930 |
| 2,092,744 | Hobson | Sept. 14, 1937 |
| 2,485,145 | Evans | Oct. 18, 1949 |
| 2,611,358 | Taylor | Sept. 23, 1952 |

FOREIGN PATENTS

| | | |
|---|---|---|
| 554,116 | France | Feb. 23, 1923 |